: 3,105,743
PREPARATION OF SUBSTANTIALLY PURE TITANIUM DIOXIDE
Vincent J. Cobb, Colts Neck, N.J., assignor to National Lead Company, New York, N.Y., a corporation of New Jersey
No Drawing. Filed Dec. 4, 1961, Ser. No. 157,016
2 Claims. (Cl. 23—202)

This invention relates in general to the preparation of substantially pure titanium dioxide material. More specifically it relates to a method for preparing substantially pure titanium dioxide material, having an anatase crystal structure, which is especially adapted for use as a raw material for making sintered titanates or as the feed material for the preparation of titanium dioxide single crystal boules.

In preparing massive single crystals of titanium dioxide or sintered titanate materials it is necessary to employ starting materials having exceptionally high purity and small particle size.

Titanium dioxide is normally prepared by commercial processes as pigment grade material. This type of titanium dioxide, however, is not of sufficient purity to be used for single crystal production. In fact even chemically pure (C.P.) grade titanium dioxide contains appreciable amounts of impurities and therefore is not satisfactory for single crystal feed material.

However, titanium dioxide of sufficient purity for single crystal feed has been produced by the process described in U.S. Patent No. 2,521,392, Leon Merker et al., issued September 5, 1950, and assigned to the same assignee as the instant invention.

This patent describes the preparation of a highly purified form of titanium dioxide boule feed, in the rutile crystal form, by calcining an ammonium titanium sulfate salt at relatively high temperatures, i.e., 850° C.–1100° C.

It has been found by the instant invention that a more reactive and hence more useful type of titanium dioxide material is one in which the titanium dioxide is produced in the anatase crystal form.

An object of the instant invention, therefore, is to produce titanium dioxide material in the anatase form. Another object is to provide a method for producing anatase titanium dioxide which has sufficiently high purity that it may be used as feed material for the production of single crystal boules. A still further object is to provide an economical and simple method for producing high purity titanium dioxide having the anatase crystal structure. These and other objects will become apparent from the following more complete description of the instant invention.

Broadly, this invention contemplates a process for producing finely divided anatase titanium dioxide material adaptable for use as feed material for the preparation of single crystals of titanium dioxide which comprises admixing an aqueous solution of titanium tetrachloride, oxalic acid and ammonium chloride to precipitate an ammonium titanium chloride oxalate composition, removing said precipitated composition from solution and calcining said composition at relatively low temperatures, i.e. from 600° C. to 700° C. to volatilize the ammonium, chloride and oxalate values and produce titanium dioxide in the anatase form.

In order to obtain the anatase titanium dioxide in a good yield and in a free flowing finely divided form, it has been found that the chemical constituents recited above should be admixed in the following ratios:

0.5 to 1.0 mole of oxalic acid, and
0.75 to 3.0 moles of ammonium chloride for each mole of titanium tetrachloride It was found that the employment of less than 0.5 mole of oxalic acid for each mole of titanium tetrachloride gave poor yields and a hard coarse product. Amounts of oxalic acid above 1.0 mole also gave poor results. Amounts of ammonium chloride below 0.75 mole per mole of titanium tetrachloride gave poor yields and a hard product, while amounts above 3.0 moles also gave hard coarse products.

The titanium tetrachloride solution, the oxalic acid and the ammonium chloride may be admixed in any manner. The preferred method of adding these constituents is to admix the titanium tetrachloride solution and the oxalic acid and add to this mixture the ammonium chloride solution. Other methods of addition are also satisfactory, such as for example, admixing the oxalic acid and the ammonium chloride and adding the titanium tetrachloride solution to the mixture.

The solutions may be reacted at temperatures from 30° C. to 80° C.

The solutions may be added rapidly to one another with agitation and the precipitate formed may be allowed to settle before filtering. The precipitate is then dried and calcined at a temperature of from 600° C. to 700° C. to remove the ammonium, chloride and oxalate values and to form titanium dioxide in the anatase form. After being calcined the product is ground slightly and screened through a 100 mesh screen. The screened product is soft, free flowing and has a bulk density of from 22.0 to 28.5 lbs. per cubic foot.

In order to illustrate more fully the instant invention the following example is presented:

A titanium tetrachloride aqueous solution was prepared as follows: 31 pounds of titanium tetrachloride were added slowly to a water cooled container containing 7.4 gallons of demineralized water. The water was agitated rapidly and the titanium tetrachloride was added at a slow rate so that the temperature of the mixture did not rise above 35° C. during the mixing operation.

The oxalic acid solution was prepared by heating 400 ml. of demineralized water to 70° C. and then adding, with stirring, 126 grams of C.P. grade oxalic acid ($H_2C_2O_4 \cdot 2H_2O$). After the oxalic acid was added the solution was adjusted to 60° C.

The ammonium chloride solution was prepared by heating 400 ml. of demineralized water to 50° C. and adding, with agitation, 80.2 grams of C.P. grade ammonium chloride. The temperature of the solution was held at 40° C.

In order to carry out the reaction of the foregoing solutions the oxalic acid solution was first agitated and to this solution were added 445 ml. of the cut titanium tetrachloride solution (containing 180 g.p.l. $TiO_2$), prepared as described above. The ammonium chloride solution was then added to the titanium tetrachloride, oxalic acid mixture and almost immediately a precipitate started to form. The mixture was then agitated for at least two hours to complete the precipitation after which the precipitate was allowed to settle and was then filtered, washed and dried under vacuum for several hours. The precipitate had the following chemical analysis:

| | Percent |
|---|---|
| $TiO_2$ | 45.5 |
| $C_2O_4$ | 26.1 |
| $NH_4$ | 3.2 |
| $Cl$ | 7.2 |
| $H_2O$ | 18.0 |

The dried precipitate was then calcined at 650° C. for three hours to remove the ammonium, chloride and oxalate values. After being calcined the product was ground lightly in a mortar and screened through a 100 mesh screen. The screened product was a soft, finely divided, free flowing exceptionally pure titanium dioxide having a bulk density of 24.8 lbs. per cubic foot and the crystal structure of anatase.

The calcined anatase titanium dioxide product had the following spectrographic analysis:

| | Percent |
|---|---|
| $SiO_2$ | 0.08 |
| $Fe_2O_3$ | 0.002 |
| $Al_2O_3$ | 0.001 |
| $Sb_2O_3$ | <0.001 |
| $SnO_2$ | <0.001 |
| Mg | 0.0005 |
| Nb | <0.01 |
| Cu | 0.0002 |
| Pb | <0.001 |
| Mn | <0.00005 |
| W | <0.005 |
| V | <0.001 |
| Cr | <0.001 |

A single crystal rutile boule was prepared from this anatase feed material using the process described in U.S. Patent No. 2,792,287 according to which the anatase feed material was passed through an oxygen-hydrogen burner where it was melted and crystallized onto a pedestal in the form of a rutile single crystal boule. Because of the anatase crystal structure of feed material of this invention it melted more rapidly and fed more uniformly and easily than the rutile feed materials used heretofore.

From the above description and by the example presented, it has clearly been shown that a soft, free-flowing titanium dioxide feed material having the crystal structure of anatase may be prepared by the simple and economical process of the instant invention; and that an anatase titanium dioxide feed material prepared by the process of the instant invention has high purity and, as a boule feed material, has feeding characteristics superior to the rutile feed materials heretofore used in the art.

While this invention has been described and illustrated by the example shown, it is not intended to be strictly limited thereto, and other variations and modifications may be employed within the scope of the following claims.

I claim:

1. Method for preparing finely divided titanium dioxide having the crystal structure of anatase and adaptable for use as feed material for the preparation of single crystal boules which comprises admixing aqueous solutions of titanium tetrachloride, oxalic acid and ammonium chloride to precipitate an ammonium titanium chloride oxalate composition, the amount of said oxalic acid being from 0.5 to 1.0 mole and the amount of said ammonium chloride being from 0.75 to 3.0 moles for each mole of titanium tetrachloride added, said solutions being reacted at a temperature of from 30° C. to 80° C., removing said precipitated composition from solution and calcining said composition at from 600° C. to 700° C. to volatilize the ammonium, chloride and oxalate values and to form titanium dioxide in the anatase form.

2. Method according to claim 1 in which the calcined anatase titanium dioxide material is screened through a 100 mesh screen.

References Cited in the file of this patent

UNITED STATES PATENTS 2,027,812     Crundall _____ Jan. 14, 1936

OTHER REFERENCES

Barksdale book, "Titanium," 1949 ed., pp. 102–104, The Ronald Press Co., N.Y.